US012086997B2

(12) United States Patent
Parian

(10) Patent No.: US 12,086,997 B2
(45) Date of Patent: Sep. 10, 2024

(54) HYBRID FEATURE MATCHING BETWEEN INTENSITY IMAGE AND COLOR IMAGE

(71) Applicant: FARO Technologies, Inc., Lake Mary, FL (US)

(72) Inventor: Jafar Amiri Parian, Schlieren (CH)

(*) Notice: Subject to any disclaimer, the term of this patent is extended or adjusted under 35 U.S.C. 154(b) by 272 days.

(21) Appl. No.: 17/678,119

(22) Filed: Feb. 23, 2022

(65) Prior Publication Data

US 2022/0351394 A1 Nov. 3, 2022

Related U.S. Application Data

(60) Provisional application No. 63/180,280, filed on Apr. 27, 2021.

(51) Int. Cl.
*G06T 7/33* (2017.01)

(52) U.S. Cl.
CPC ...... *G06T 7/33* (2017.01); *G06T 2207/10024* (2013.01); *G06T 2207/10028* (2013.01)

(58) Field of Classification Search
CPC ............. G06T 7/33; G06T 2207/10024; G06T 2207/10028; G06T 2200/04; G06T 2207/20221; G06T 7/337
See application file for complete search history.

(56) References Cited

U.S. PATENT DOCUMENTS

| 8,384,914 B2 | 2/2013 | Becker et al. |
| 8,705,012 B2 | 4/2014 | Greiner et al. |
| 11,094,113 B2 * | 8/2021 | Mundy ............... G06T 7/593 |
| 2015/0341552 A1 * | 11/2015 | Chen ................... G06T 11/60 348/38 |
| 2016/0097858 A1 * | 4/2016 | Mundhenk ........... G01S 17/86 348/50 |
| 2018/0262737 A1 * | 9/2018 | Monnier ............... H04N 13/15 |

(Continued)

FOREIGN PATENT DOCUMENTS

| EP | 3955020 A1 | 2/2022 |
| WO | WO-2020069049 A1 * | 4/2020 ........... G06N 3/0454 |

OTHER PUBLICATIONS

European Search Report; Issued: Oct. 17, 2022; Application No. 22169323.7; Filed: Apr. 21, 2022; 9 pages.

(Continued)

*Primary Examiner* — Michael Robert Cammarata
(74) *Attorney, Agent, or Firm* — McCarter & English, LLP; Dave S. Christensen

(57) ABSTRACT

A point cloud is colorized by mapping a color image using an intensity image. The mapping includes detecting multiple features from the intensity image using a feature-extraction algorithm. A feature is extracted that is not within a predetermined vicinity of an edge in the intensity image. A template is created by selecting a portion of a predetermined size from the intensity image with the feature at the center. A search window is created with the same size as the template by selecting a portion of a luminance image as a search space. The luminance image is obtained from the color image. A cost value is computed for each pixel of the search space by comparing image gradients of the template and the search window. A matching point is determined in the color image corresponding to the feature based on the cost value for each pixel of search space.

20 Claims, 11 Drawing Sheets
(5 of 11 Drawing Sheet(s) Filed in Color)

(56) References Cited

U.S. PATENT DOCUMENTS

| | | | | |
|---|---|---|---|---|
| 2018/0364033 A1* | 12/2018 | Döring | ............... | G01B 11/245 |
| 2020/0225356 A1* | 7/2020 | Anderberg | ............... | G06T 7/90 |
| 2021/0304496 A1* | 9/2021 | Moon | ............... | G06F 18/22 |
| 2021/0321016 A1* | 10/2021 | Flohr | ............... | H04N 23/10 |
| 2022/0020178 A1* | 1/2022 | Metzler | ............... | G06T 5/60 |
| 2022/0046221 A1 | 2/2022 | Brenner et al. | | |
| 2022/0051422 A1 | 2/2022 | Parian | | |
| 2022/0128671 A1 | 4/2022 | Parian et al. | | |
| 2022/0137225 A1* | 5/2022 | Parian | ............... | G01S 7/4817 |
| | | | | 356/4.01 |
| 2024/0069203 A1* | 2/2024 | Frank | ............... | G01S 17/88 |

OTHER PUBLICATIONS

Resch et al., "Local Image Feature Matching Improvements for Omnidirectional Camera Systems," 22nd International Conference on Pattern Recognition, 2014, pp. 918-923.

Tareen et al., "A comparative analysis of Sift, Surf, Kaze, Akaze, Orb, and Brisk," 2018 International Conference on Computing, Mathematics and Engineering Technologies (iCoMET), 2018, pp. 1-10.

* cited by examiner

HYBRID FEATURE MATCHING BETWEEN INTENSITY IMAGE AND COLOR IMAGE

CROSS REFERENCE TO RELATED APPLICATIONS

This application claims the benefit of U.S. Provisional Application Ser. No. 63/180,280, filed Apr. 27, 2021, the entire disclosure of which is incorporated herein by reference.

BACKGROUND

The subject matter disclosed herein relates to use of a measurement devices that capture visual data of the surroundings to facilitate measuring one or more attributes of the surroundings. Particularly, the technical solutions described herein are directed to the use of measurement devices that include a laser scanner that captures intensity images of the surrounding and a color camera that captures color images of the same surroundings. More specifically, technical solutions are described herein to improve feature matching between an intensity image and a color image. In some cases, the laser scanner is a three-dimensional (3D) scanner used to capture 3D point clouds (point clouds) in the surroundings, the intensity image representing of light reflectivity of the 3D points in the point clouds, and the color image representing the color data corresponding to the 3D points, Typically, the 3D scanner is a time-of-flight (TOF) laser scanner, which steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating the 3D image requires at least three values for each data point. These three values may include the distance and two angles, or may be transformed values, such as the x, y, z coordinates. In an embodiment, the 3D image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a 2D camera, such as a color camera, mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner 3D image. To generate a color scanner image, at least three positional coordinates (such as x, y, z) and three color values (such as red, green, blue "RGB") are collected for each data point.

Some 3D scanners use high dynamic range (HDR) techniques with the color camera to provide enhanced color images that used with the scanner image to provide a more accurate color representation of the scanned environment. HDR techniques involve acquiring multiple images at each location with different exposure settings. These images are then combined to provide a resulting image that more accurately represents the environment. Another option for HDR, sometimes named interference mode, is to apply different exposure times to different parts of one captured image. This technique is useful in areas having high contrast (light and dark areas). While HDR images are certainly useful in enhancing the color of the scanner image, the acquiring of multiple images at different exposures can be time consuming. For example, to acquire images in a 360 spherical area about the 3D scanner may take more than 60 images. If each of these 60 images has multiple exposures, then the time to acquire all of the images may be lengthy.

Accordingly, while existing 3D scanners are suitable for their intended purposes, what is needed is a 3D scanner having certain features of embodiments of the present disclosure.

BRIEF DESCRIPTION

According to one or more embodiments, a system includes a three-dimensional (3D) scanner that captures a point cloud that comprises a plurality of 3D coordinates corresponding to one or more objects scanned in a surrounding environment. The system further includes a first camera that captures an intensity image of the surrounding environment corresponding to the point cloud, each pixel in the intensity image representing a luminance of reflected light. The system further includes an auxiliary camera configured to capture an ultrawide-angle color image of the surrounding environment corresponding to the point cloud, each pixel in the color image representing a color. The system further includes one or more processors configured to colorize the point cloud using the color image by mapping the color image to the point cloud using the intensity image. Mapping the color image to the intensity image includes detecting a plurality of features from the intensity image using a feature-extraction algorithm. The mapping further includes extracting a feature from the plurality of features based on a determination that the feature is not within a predetermined vicinity of an edge in the intensity image. The mapping further includes creating a template by selecting a portion of a predetermined size from the intensity image with the feature at the center. The mapping further includes creating a search window with the same size as the template by selecting a portion of a luminance image as a search space, wherein the luminance image is obtained by transforming the color image. The mapping further includes computing a cost value for each pixel of the search space by comparing an image gradient of the template with an image gradient of the search window. The mapping further includes determining a matching point in the color image corresponding to the feature based on the cost value for each pixel of search space.

According to one or more embodiments, a method includes colorizing a point cloud using a color image by mapping the color image to the point cloud using an intensity image, wherein, the point cloud is captured by a 3D scanner, the intensity image is captured by a camera, and the color image is captured by an auxiliary camera. Mapping the color image to the intensity image includes detecting a plurality of features from the intensity image using a feature-extraction algorithm. The mapping further includes extracting a feature from the plurality of features based on a determination that the feature is not within a predetermined vicinity of an edge in the intensity image. The mapping further includes creating a template by selecting a portion of a predetermined size from the intensity image with the feature at the center. The mapping further includes creating a search window with the same size as the template by selecting a portion of a luminance image as a search space, wherein the luminance image is obtained by transforming the color image. The mapping further includes computing a cost value for each pixel of the search space by comparing an image gradient of the template with an image gradient of the search window. The mapping further includes determining a matching point in the color image corresponding to the feature based on the cost value for each pixel of search space.

According to one or more embodiments, a computer program product includes one or more memory devices with computer executable instructions stored thereon, the computer executable instructions when executed by one or more processors cause the one or more processors to perform a method. The method includes colorizing a point cloud using a color image by mapping the color image to the point cloud using an intensity image, wherein, the point cloud is captured by a 3D scanner, the intensity image is captured by a camera, and the color image is captured by an auxiliary camera. Mapping the color image to the intensity image includes detecting a plurality of features from the intensity image using a feature-extraction algorithm. The mapping further includes extracting a feature from the plurality of features based on a determination that the feature is not within a predetermined vicinity of an edge in the intensity image. The mapping further includes creating a template by selecting a portion of a predetermined size from the intensity image with the feature at the center. The mapping further includes creating a search window with the same size as the template by selecting a portion of a luminance image as a search space, wherein the luminance image is obtained by transforming the color image. The mapping further includes computing a cost value for each pixel of the search space by comparing an image gradient of the template with an image gradient of the search window. The mapping further includes determining a matching point in the color image corresponding to the feature based on the cost value for each pixel of search space.

In one or more embodiments, the template comprises a first template based on an image gradient along x-axis and a second template based on image gradient along y-axis.

In one or more embodiments, the search window comprises a first search window based on an image gradient along x-axis and a second search window based on image gradient along y-axis.

In one or more embodiments, the cost value is computed using normalized values of the template and the search window.

In one or more embodiments, the color image is transformed to a spherical image, and the spherical image is transformed into the luminance image.

In one or more embodiments, a search window is selected from the luminance image, and the cost value is computed by comparing each pixel in the template with each pixel of the search window.

In one or more embodiments, the color image comprises a first image captured by a first lens of the auxiliary camera and a second image captured by a second lens of the auxiliary camera.

In one or more embodiments, the camera is an integral part of the 3D scanner.

In one or more embodiments, the auxiliary camera is mounted on the 3D scanner at a predetermined position relative to the 3D scanner.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
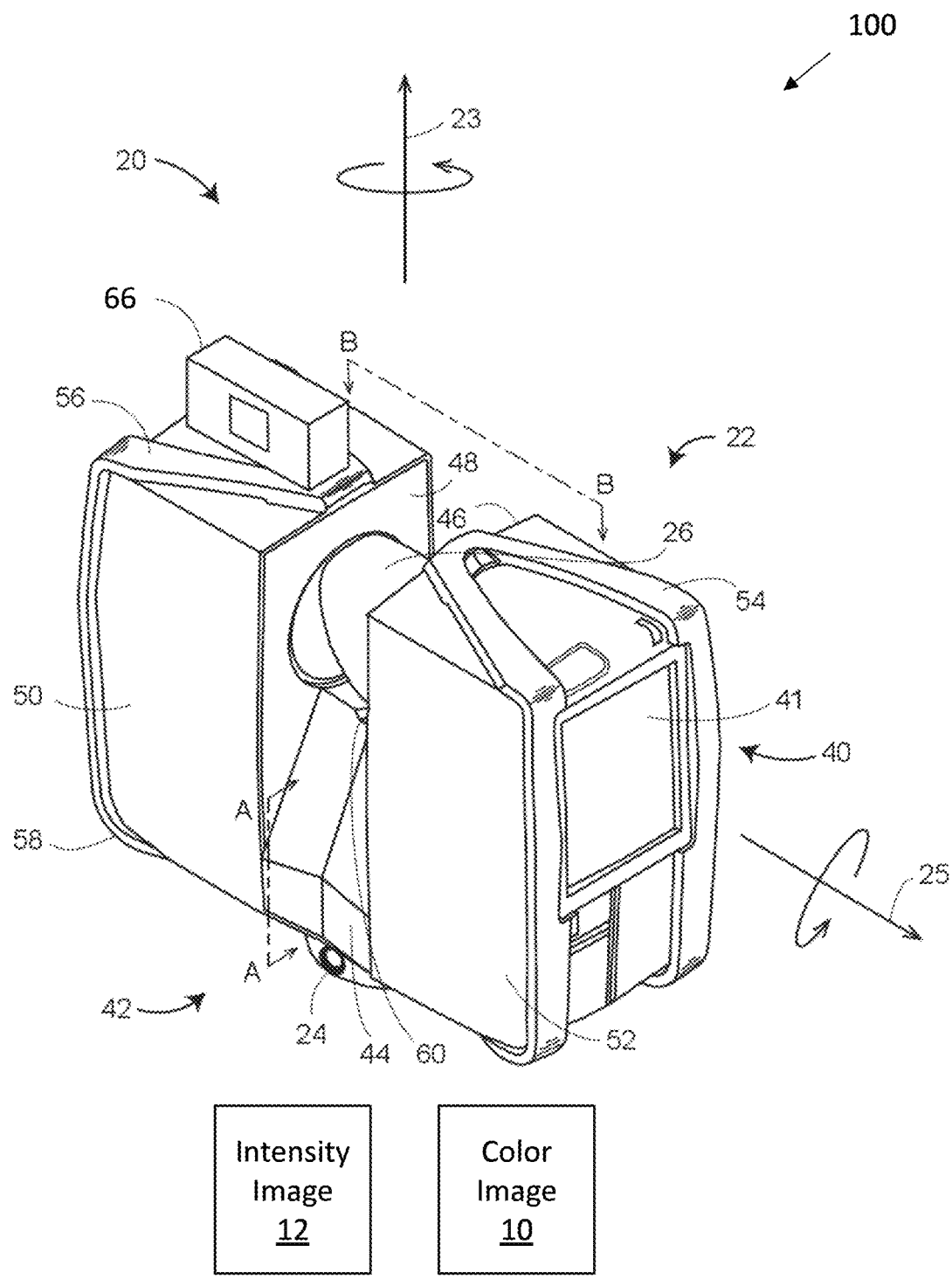
FIG. 1 is a perspective view of a laser scanner in accordance with an embodiment.

The detailed description explains embodiments of the invention, together with advantages and features, by way of example with reference to the drawings.

DETAILED DESCRIPTION

Embodiments herein relate to a measuring device having a laser scanner and at least one camera to capture color images. The camera, in some embodiments, is an ultrawide-angle lens camera. Embodiments of the technical solutions described herein provide advantages to acquiring three-dimensional (3D) coordinates of an area of the environment, acquiring a 2D color image of that area using the camera, and mapping of the 2D image to the 3D coordinates. The result is an interactive 3D image of the area that includes the captured 3D coordinates and color. The mapping is performed based on performing feature matching using two images: an intensity image of the area that is captured by the laser scanner, which is an active sensor; and the color image of the area that is captured by the camera, which is a passive sensor. An "active sensor" is a sensing device that requires an external source of power to operate; contrast with a "passive sensor," which detects and responds to some type of input from the physical environment. In the context of the measuring devices, the laser scanner is an active sensor because it is a device with a transmitter that sends out a signal, e.g., light wavelength to be reflected off a target, with data (e.g., intensity image) gathered by the sensor upon the signal's reflection. In contrast, the camera is a passive sensor because it captures existing light (without actively transmitting it) that is reflected by one or more objects in the area being captured.

The feature matching includes finding reliable correspondences between features detected in the data from the active sensor (e.g., intensity image(s)) and the passive sensor (e.g., color image(s)). Determining such reliable correspondences, e.g., between an intensity image and a color image, is a technical challenge because active sensors like the laser scanner cannot localize points that are closer (within a predetermined distance from) to edges in the area being captured (i.e., scanned).

The technical challenges with performing feature matching with data from active sensors and data from passive sensors is addressed by the technical solutions described herein. While the technical solutions are described herein using embodiments that use a color camera as the passive sensor and a laser scanner as the active scanner, aspects of the technical solutions described herein can be used with any other devices that can be used as active and/or passive sensors.

Technical solutions described herein address the technical challenges noted herein using a hybrid feature matching, which combines the characteristics of both feature extraction and template matching. For example, existing feature extraction techniques are improved to generate specific robust features. Further, existing template matching techniques are improved to be invariant to color and intensity variation. Embodiments of the technical solutions described herein, accordingly, provide improvements to feature matching between active sensor data (intensity image), and passive sensor data (color image) by providing reliable correspondences in the detected features. Further, embodiments of the technical solutions herein facilitate fast, and reliable laser scan colorization and laser scan on-site compensation.

Embodiments of the technical solutions described herein, thus, provide improvement to computing technology of feature matching between active sensor data and passive sensor data. Further, embodiments of the technical solutions described herein provide a practical application to use measuring devices and colorizing the 3D data captured by a laser scanner using color images captured by a camera.

Figure 2:
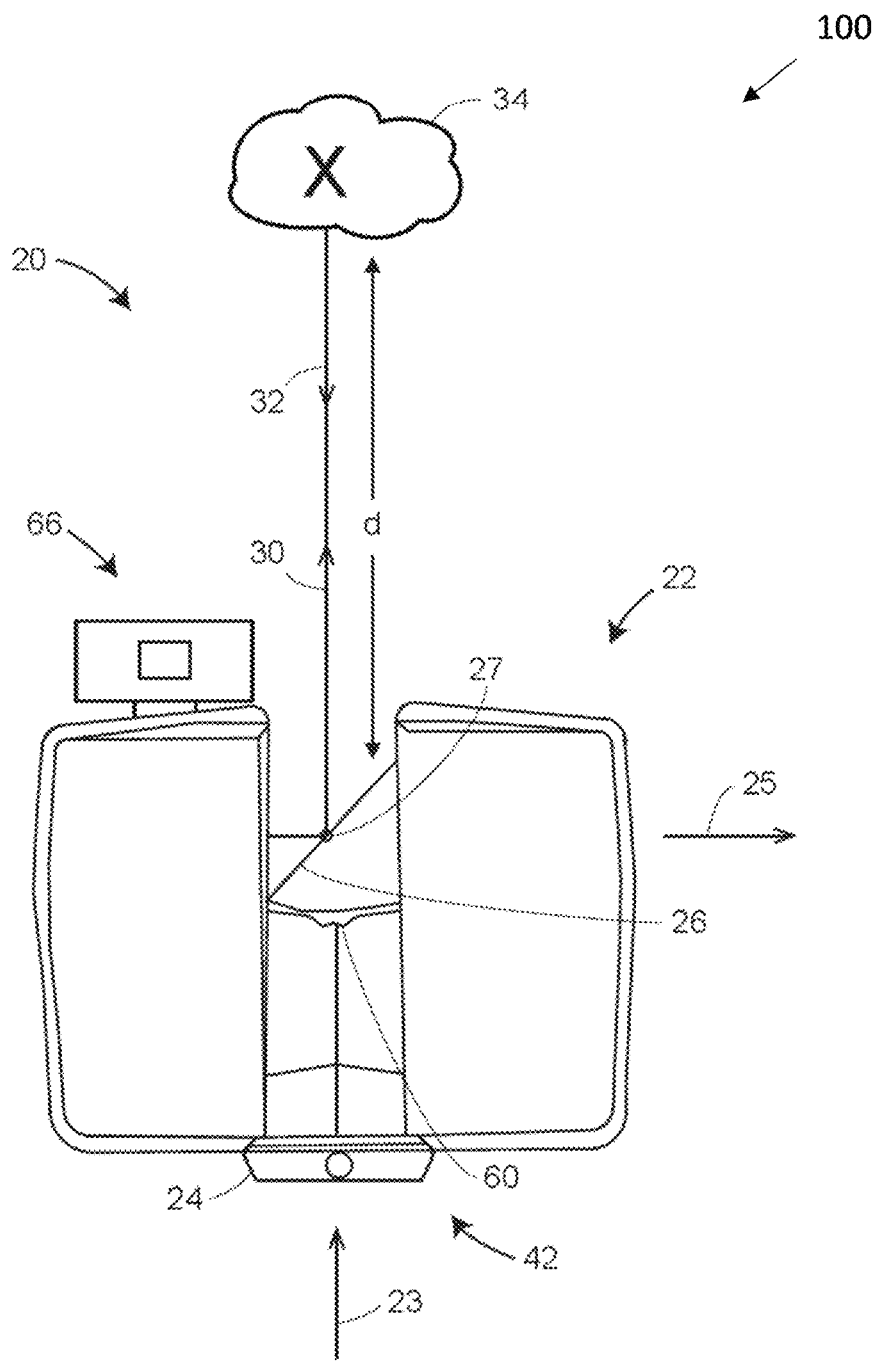
FIG. 2 is a side view of the laser scanner illustrating a method of measurement according to an embodiment.
Figure 3:
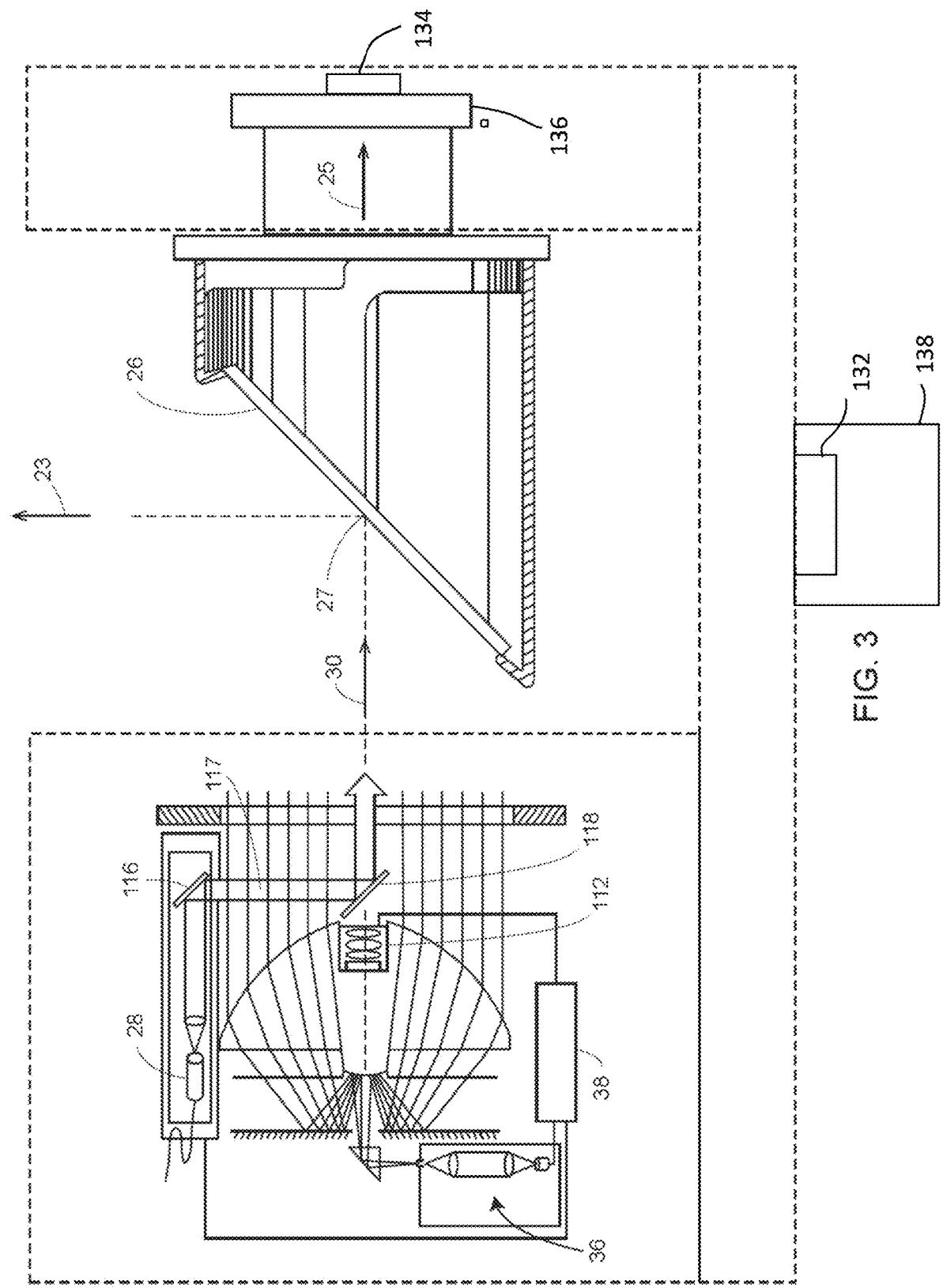
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images (10) that are used to colorize the scanned data. The intensity values are stored as an intensity image 12.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera." The auxiliary image acquisition device 66 is referred to as a "camera" 66 herein, and it should be understood that the camera 66 encompasses various types of devices, such as those listed above. The camera 66 captures color images 10 of the area/portion that is being captured by the scanner 20.

In some embodiments, the color image 10 acquired using the camera 66 captures color data in the spherical volume surrounding the laser scanner 20. In exemplary embodiments, the color image 10 is in a red-green-blue (RGB) color model. In other embodiments, other color models, e.g., cyan, magenta, and yellow (CMY), or cyan, magenta, yellow, and black (CMYK), or any other color model can be used.

In an embodiment, a camera 112 is located internally to the scanner (see FIG. 3) and may have the same optical axis as the 3D scanner device. In this embodiment, the camera 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The camera 112 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
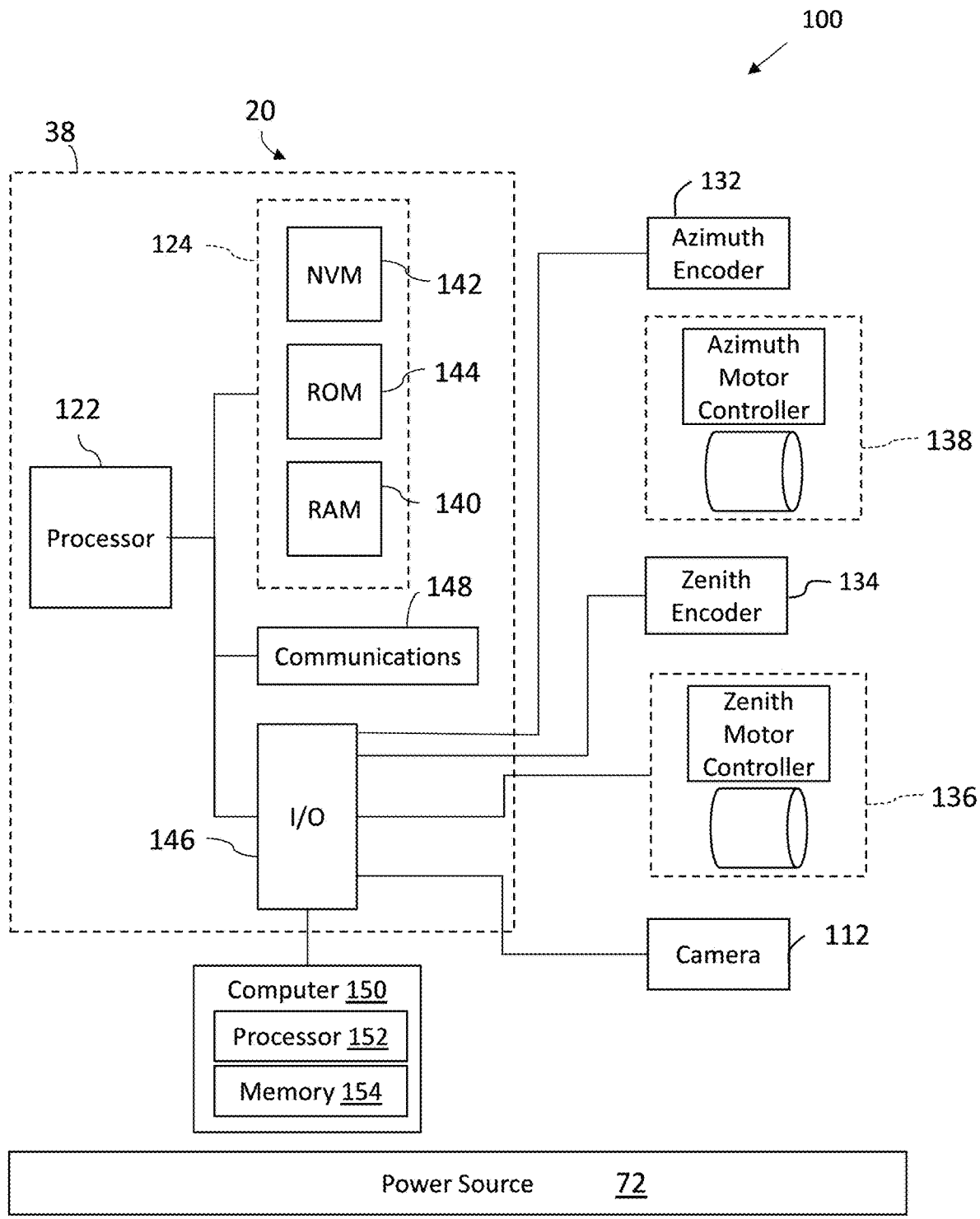
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 112, angular/rotational measurements by a first or azimuth encoder 132, and angular/rotational measurements by a second axis or zenith encoder 134.

In general, controller 38 accepts data from encoders 132, 134, light receiver 36, light source 28, and camera 112 and is given certain instructions for the purpose of generating a 3D point cloud of a scanned environment. Controller 38 provides operating signals to the light source 28, light receiver 36, camera 112, zenith motor 136, and azimuth motor 138. In one or more embodiments, the controller 38 also provides operating signals to the auxiliary image acquisition device 66. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

In some embodiments, the controller communicates the captured data, i.e., point clouds and images, to a computer 150. The computer 150 can include one or more processors 152 and a memory device 154. The computer 150 generates a 3D colorized image by colorizing the 3D coordinates in the point clouds using the color images 10 from the 2D camera 66. Such colorization includes mapping the color images 10 from the camera 66 with the point cloud(s) and intensity image(s) 12 captured by the scanner 20.

Figure 5:
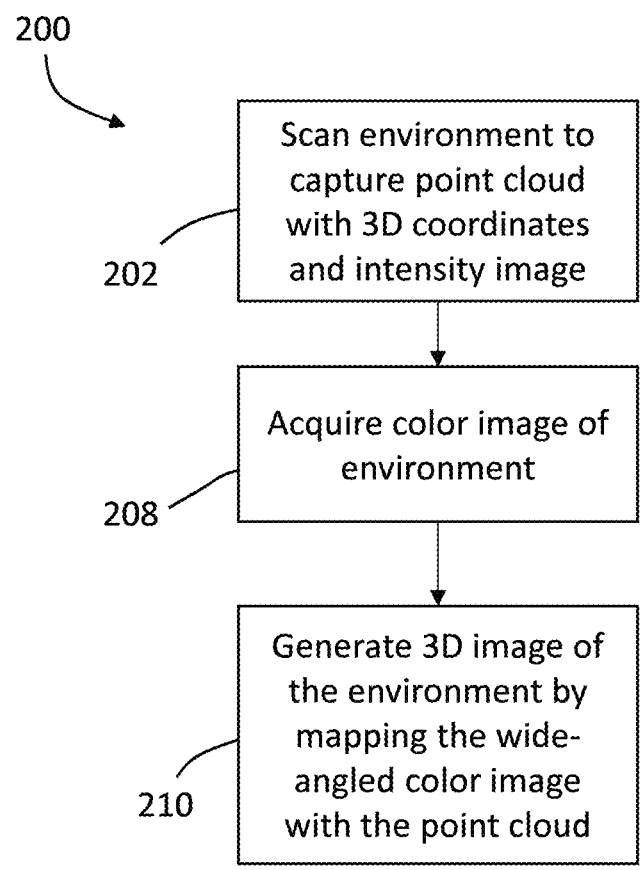
FIG. 5 is a flow diagram of a method of generating enhanced color scans with the laser scanner of FIG. 1.

Referring now to FIG. 5, an embodiment of a method 200 is shown for generating a scan of the environment with the scanner 20. The method 200 begins in block 202 where the environment in which the scanner 20 is positioned is scanned. As described herein, the volume (e.g. the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 is determined. Thus, a 3D coordinate of a point in the environment may be determined for each emitted and received light beam. Further, for each light beam, an intensity value of the returned light beam is measured and recorded in the intensity image 12.

The light beams are emitted and received as the measurement head 22 is rotated 180 degrees about the axis 23. The method 200 further includes, at block 208, acquiring one or more color images 10 of the environment. In an embodiment, a color images 10 are acquired by the camera 66. In one or more embodiments, color image 10 is acquired using an ultrawide-angle lens to capture color data in the spherical volume surrounding the laser scanner 20.

Once the 2D color image 10 is acquired, the method 200 includes, at block 210, generating a colorized 3D image by mapping the color image 10 with the 3D coordinates in the point cloud captured by the scanner 20. Such mapping of the color image 10 with the 3D point cloud using the intensity image 12 is described further herein.

It should be appreciated that the method 200 provides advantages in generating enhanced color 3D scans over techniques that use HDR (High Dynamic Range) imaging techniques because of requiring fewer number of images to be captured by using an ultrawide-angle field of view.

Physical agents living in complex environments, such as humans and animals, use two types of visual sensing abilities. One is to focus on objects with a precise but small retina and the other is to look around the environment with a wide but coarse retina. Both visual sensing mechanisms are used to enable robust and flexible visual behaviors. In particular, the wide visual information obtained by looking around is used to monitor wide areas and to avoid undesired situations. If the complete surrounding in space can be involved into the perception process, orientation and navigation in space becomes easier and more reliable.

Typically, a camera's field of view is smaller than the human field of view, which limits objects from being captured in a single picture. This technical challenge is addressed by using an ultrawide-angle, i.e., hemispherical or fisheye lens, which creates a wide field of view image. With an ultrawide-angle lens an image of more than 180° angular field of view can be acquired. Due to the large field of view, it has been used in many applications with different domains such as forestry, the study of plant canopies, geodesy to produce a site obstruction diagram for future GPS missions, etc.

Figure 6:
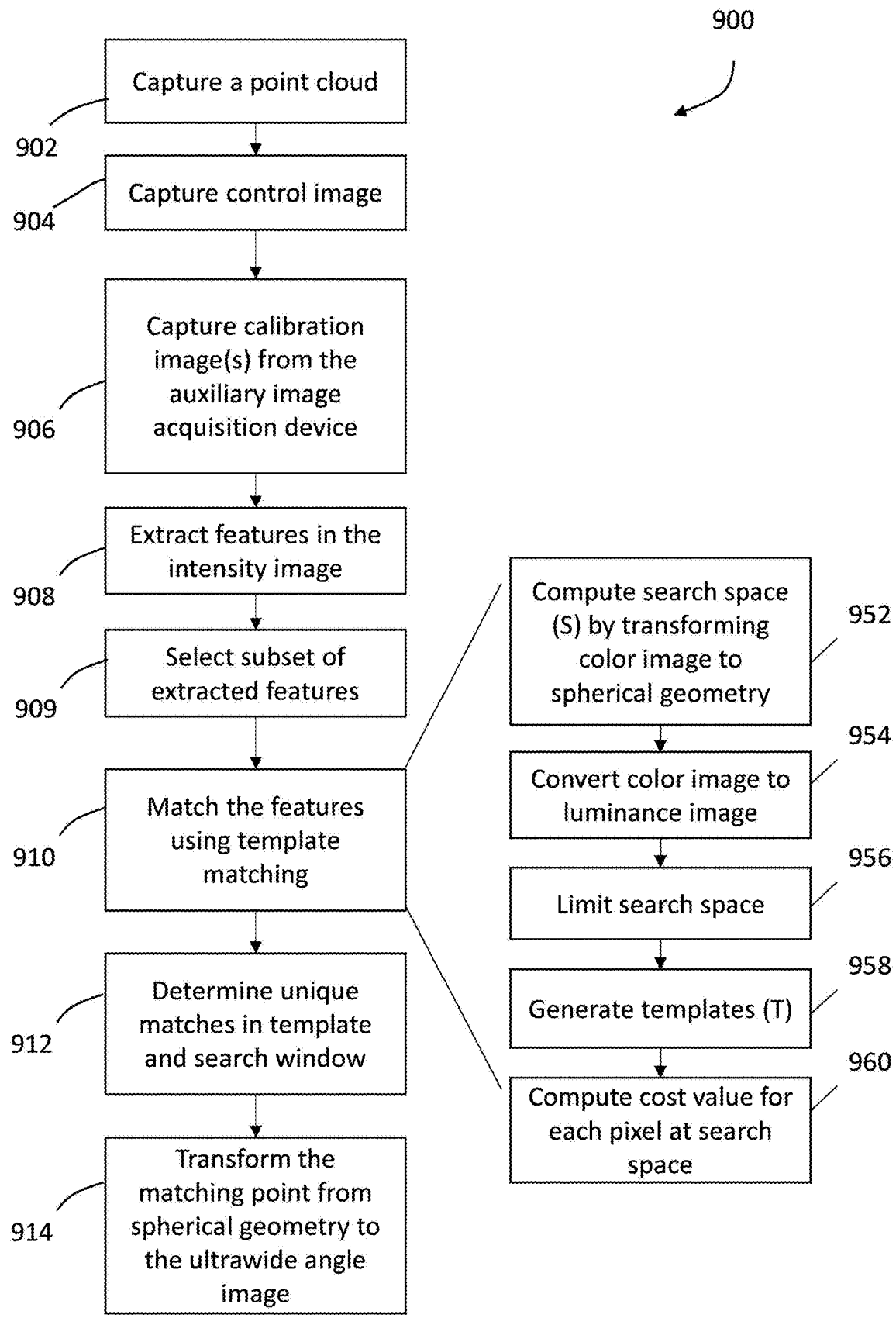
FIG. 6 depicts a flowchart for a hybrid feature matching between an intensity image and a color image according to one or more embodiments.

FIG. 6 depicts a flowchart for a dynamic construction of control points for calibrating the camera according to one or more embodiments. The method 900 includes capturing a point cloud using the 3D scanner 20, at block 902. Further, a control image is captured using the camera 112 that is integrated with the 3D scanner 20, at block 904. In one or more embodiments, multiple images are captured using the integrated camera 112, and the images are stitched together. Alternatively, in the case that the 3D scanner 20 does not have an integrated camera 112, an intensity image 12 is captured and used as the control image. The intensity image 12 does not have color information (e.g., Red, Green, Blue (RGB), or Cyan, Magenta, Yellow (CMY) etc.), rather has light intensity information at each captured pixel in the image. Further, calibration images are captured by the auxiliary image acquisition device 66, which is to be calibrated, at block 906.

Method 900 further includes extracting features in the intensity image 12 captured by the scanner, at block 908. The intensity image 12 can be captured by the internal camera 112 to be used as the control image. Feature extraction can be performed using one or more known algorithms such as, Harris corner detector, Harris-Laplace-scale-invariant version of Harris detector, multi-scale oriented patches (MOPs), scale invariant feature transform (SIFT), speeded up robust features (SURF), Features from accelerated segment test (FAST), binary robust invariant scalable keypoints (BRISK) algorithm, oriented FAST and rotated BRIEF (ORB) algorithm, KAZE with M-SURF descriptor, and any other feature extraction technique. Some of the feature extraction techniques such as, SIFT, SURF, BRISK and ORB also provide descriptors for the extracted features. Alternatively, or in addition, any feature descriptor definition can be associated to the extracted features. For example, the following descriptor definitions can be used: normalized gradient, principal component analysis (PCA) transformed image patch, histogram of oriented gradients, gradient location and orientation histogram (GLOH), local energy-based shape histogram (LESH), BRISK, ORB, fast retina keypoint (FREAK), and local discriminant bases (LDB).

In an embodiment, the feature extraction is based on a modified AKAZE algorithm. In some embodiments, the feature extraction is executed on a graphics processing unit (GPU) to increase runtime efficiency. The descriptors assigned to the extracted features are the modified version of the M-SURF descriptors. The feature extraction results include a collection of points from each image, each point in the collection being an extracted "feature." The criteria for extracting such features can include detecting semantic features from the images such as, corners, edges, doors, windows, etc. Alternatively, or in addition, the feature extraction can include detecting points that provide combinations of parameters that facilitate reducing the number of features required to processed for effective feature matching. For example, such feature dimensionality reduction can include techniques such as principal component analysis (PCA), autoencoder, subspace learning, semidefinite embedding, isomap, partial least squares, etc.

Further, a subset of the features that are detected is selected, at block 909. The selected features are in regions not near to an edge in the surroundings. The selection can be performed by first discarding edge response points along any edge in the intensity image 12. The Hessian matrix (H) is used to determine features that are along any edge:

$$H = \begin{bmatrix} D_{xx} & D_{xy} \\ D_{xy} & D_{yy} \end{bmatrix}$$

The eigenvalues of H are proportional to the principal curvatures of D, where D is the difference of gaussian of the intensity image 12. D $(x,y,\sigma)$ is given by:

$$D(x,y,\sigma) = L(x,y,k_i\sigma) - L(x,y,k_j\sigma).$$

Here, L is the convolution of the original intensity image 12 (I(x, y)) with a Gaussian blur G at scale $k\sigma$. An R-value can be computed using the Hessian matrix:

$$R = Tr(H)^2/Det(H)$$

If the R-value of an extracted feature is determined to be within a predetermined range, that feature is selected (or discarded). The particular range is selected to determine not only features that are along an edge, but also features that are within a predetermined vicinity from an edge in the intensity image 12.

In some embodiments, the feature extraction includes subpixel determination of the locations of the features in the intensity image 12, which is performed in real-time based on bilinear interpolation. The feature extraction also includes grouping the convolved images (L) by octave (an octave corresponds to doubling the value of σ). Typically, the feature extraction is performed using a 4-level hybrid pyramid and 4 octaves. In some embodiments, the feature extraction is done on only a pyramid with 1 level and three octaves to avoid extracting features with different scales.

The extracted features are used to perform an area-based matching of the intensity image 12 and the color image 10, at block 910. Area-based matching can be performed using "template matching," which is a technique in digital image processing for finding small parts of an image which match a template image. In existing implementations of template matching, first a part of the search image is selected for use as a template. Here, a search image is referred to as S(x, y), where (x, y) represent the coordinates of each pixel in the search image, a template is referred to as $T(x_t, y_t)$, where $(x_t, y_t)$ represent the coordinates of each pixel in the template. In existing template matching the centre (or the origin) of the template $T(x_t, y_t)$ is moved over each (x, y) point in S to calculate a cost value between the coefficients in S(x, y) and $T(x_t, y_t)$ over the whole area spanned by the template. The cost value, in some embodiments, can be a sum of products, although other statistical techniques can also be used in other embodiments. As all possible positions of the template with respect to the search image are considered, the position with lowest cost is deemed to be the best position.

Figure 7:
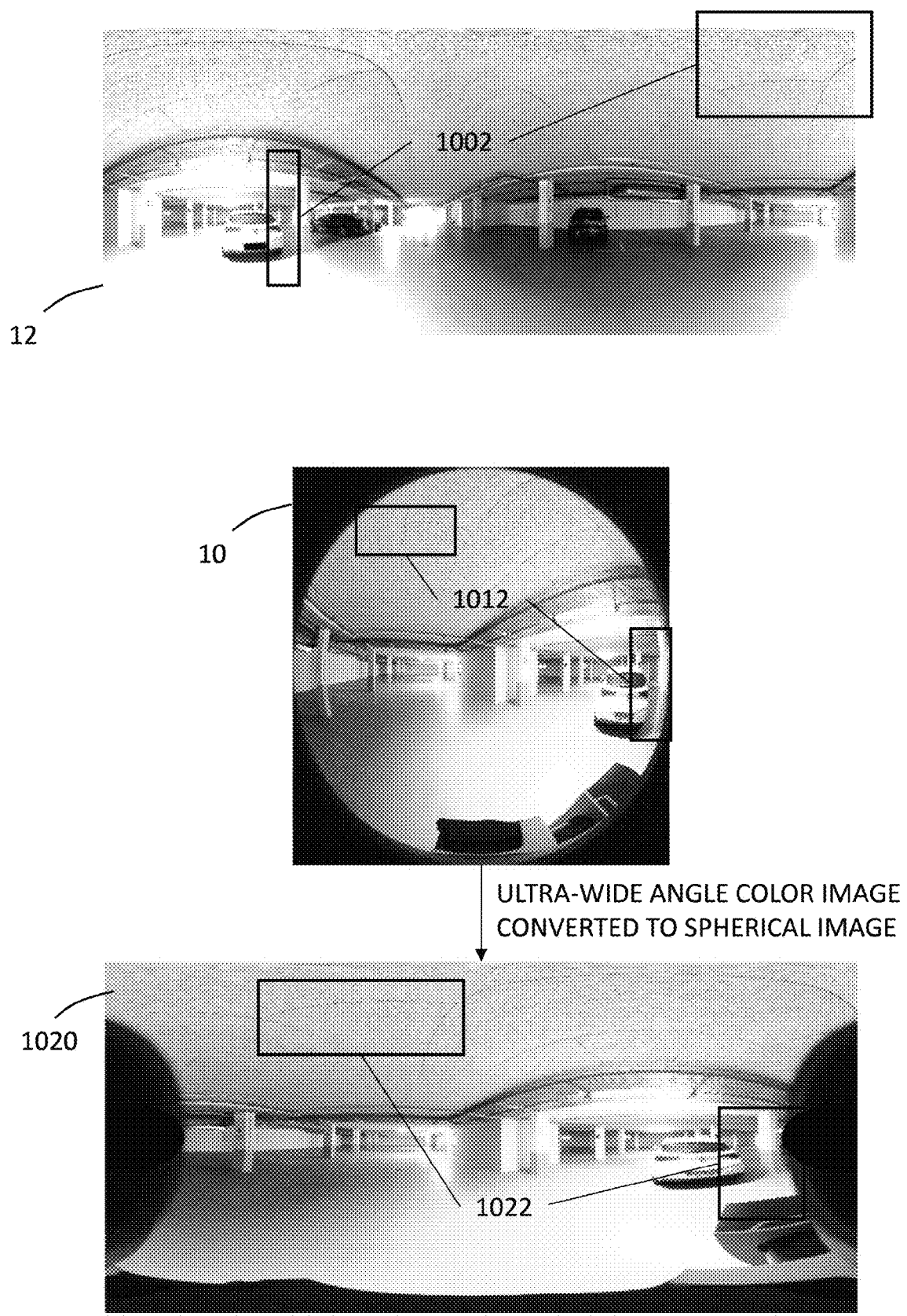
FIG. 7 depicts example intensity image and color image according to one or more embodiments.

In embodiments of the technical solutions herein using existing techniques for template matching poses technical challenges. For example, corresponding regions in the ultrawide-angle color image 10 from the camera 66 and the intensity image 12 from the scanner 20 have local geometrical deformation differences because of different geometrical projection models. FIG. 7 shows an example intensity image 12 and the corresponding ultrawide-angle color image 10 and for example, two corresponding image regions 1002, 1012 with geometrical difference. These deformation differences limit the performance of feature matching and can result in a limited number of matching features.

Further, performing template matching is computationally expensive because the template T has to be moved across each pixel in S to determine the best position, i.e., best match. This search space S is initially the dimension of the color image 10. For example, for a typical 10 Mega-Pixel image, the template T has to move over 10'000'000 pixels and the cost value is computed for this number of pixels, which is computationally very time-consuming.

Such technical challenges are addressed by embodiments of the technical solutions described herein.

To reduce/eliminate the local deformation difference at corresponding regions, the ultrawide-angle color image 10 is converted to a spherical image 1020 (FIG. 7), at block 952. This transformation is based on the ultrawide-angle sensor model, describe herein, and using a mapping between the spherical image 1020 and the ultrawide-angle color image 10. By this transformation, the differences of local deformation at corresponding regions are minimized (comparing 12 and 1020 in FIG. 7). Therefore, as a result the template image and the window around the best match at search space become more similar.

In order to establish the mapping function from the ultra-wide-angle image points (x, y) to spherical image pixels (col, row), the space vector of the pixels of the ultra-wide-angle image is computed as follows:

$$s = \begin{pmatrix} x + \Delta x \\ y + \Delta y \\ -\dfrac{c}{m} \end{pmatrix}$$

in which, x, y, c, m, Δx, and Δy are preconfigured calibration parameters of the measuring device 100, or parameters that are based on the calibration parameters. The description of such parameters, and the calibration parameters can be found in a co-pending application (U.S. Pat. No. 11,790, 557), which is incorporated herein by reference. The space vector is then normalized $$\left(s = \dfrac{s}{\|s\|}\right).$$

"s" is in the 3D Cartesian coordinate system with unit length. By converting the Cartesian coordinate system to Polar coordinate system, (θ, φ) are computed. θ is the azimuth angle with a range from [0, 360°]. φ is the zenith angle having a range [0, 90°]. The pixel in the spherical image (col,row) is computed by dividing (θ,φ) to the pitch angle. The pitch angle is computed by dividing the pixel pitch of the external camera to its camera constant.

The spherical image 1020 corresponding to the color image 10 is used as search space domain (i.e., S), in template matching. The spherical image 1020 is further converted to a luminance image in some embodiments, at block 954. Additionally, the larger of the luminance image and the intensity image is resized to match the size of the smaller of the two, in one or more embodiments, if the two images are of different sizes.

Further, because computing cost for the entire search space domain is very time consuming, and computer resource intensive, the search space domain is reduced, at block 956. In some embodiments, the search space S is limited by using "limiting search window" parameters that include camera calibration parameters, and exterior orientation of the intensity image 12 and color image 10.

For limiting the search space for a feature from the intensity image 12, the 3D point (from the point cloud) corresponding to the intensity image 12 is back projected into the spherical image 1020. The limited search space domain S for that feature is then selected to be a window of a predetermined size (e.g., 40×40 pixels) around this back-projected point. The size of this window used as the search space (S) can be configured to be smaller if the search window parameters are estimated accurately and can be configured to be larger for an approximated search window parameters.

Further, at block 958, two templates are generated for each of the selected features from the intensity image 12. For each feature, an image patch of a predetermined size (e.g., 21×21 pixels) is selected, where the feature is the center of that image patch. While existing techniques typically use the intensity values at the pixels in the image patch for performing template matching, technical solutions herein use an image gradient along x-axis ($\Delta_x$); and an image gradient along y-axis ($\Delta_y$). The image gradients are the most invariant properties with respect to difference of intensity and color because they preserve edge information. Accordingly, technical solutions herein provide robust feature matching.

The two templates that are generated for each feature include a first template based on image gradient along x-axis and, a second template based on image gradient along y-axis. The image gradients along x-axis and y-axis are computed as well for the two search windows, for which the cost is being computed. Each template and search window are normalized by their mean and standard deviation values in order to equalize the variation to edge response between the template and search window. Accordingly, two normalized templates $\hat{\Delta}_x T$ and $\hat{\Delta}_y T$ and two normalized search windows $\hat{\Delta}_x S$ and $\hat{\Delta}_y S$ are created.

Further, at block 960, a cost value is computed for each pixel at search space. The cost value at pixel is computed for performing the template matching using the following function:

$$\text{cost} = \sum_{i=0}^{T_{row}} \sum_{j=0}^{T_{col}} \left( |\hat{\Delta}_x T(i,j) - \hat{\Delta}_x S(i,j)| + |\hat{\Delta}_y T(i,j) - \hat{\Delta}_y S(i,j)| \right)$$

Here, T: template (image patch) with dimension of ($T_{row}$, $T_{col}$), S: Search window; (i, j): corresponds to (row, col) of the template T; $\hat{\Delta}_x$: is an image operator for computing the normalized image gradient along x-axis (columns); and $\hat{\Delta}_y$: is an image operator for computing the normalized image gradient along y-axis (rows).

By moving the template (image patch) over the search space, the cost value is computed for each pixel of the search space domain. Therefore, a matrix of cost values with the dimension of the search space is constructed.

At block 912, the matching features from the template T and the search window S are determined. In most cases, the lowest cost indicates the best match, if there are no other similar matches because of repeatability in the search domain S. In the case that there are multiple windows in the search window S, which are similar to the template, a unique match is determined as described further. Consider that the two sequential minimal costs and their corresponding position are determined as minCost1, posMinCost1; and minCost2, posMinCost2. A match is only accepted if

```
distance(posMinCost1, posMinCost2) > thrMinDist, and if
minCost1 < simRatio * minCost2.
```

Here, thrMinDist is a predetermined distance threshold, (e.g. 2 pixels) that facilitates ignoring similarity around the position with the minimal cost. The probability that a match is correct can be determined by taking the ratio (simRatio) of first minimal cost (minCost1) to the second min cost (minCost2). simRatio is a predetermined value e.g. 0.8 equivalent to eliminating 90% of the false matches while discarding less than 5% of the correct matches. In other words, it determines that the match is a unique match and that there is no other similar matches in the search space S.

The template matching accordingly provides, for each selected feature from the intensity image 12, a corresponding point (pixel) in the spherical image 1020. The matching point from the spherical image 1020 is transformed back to the original ultrawide-angle color image 10 by reverse mapping.

Figure 8:
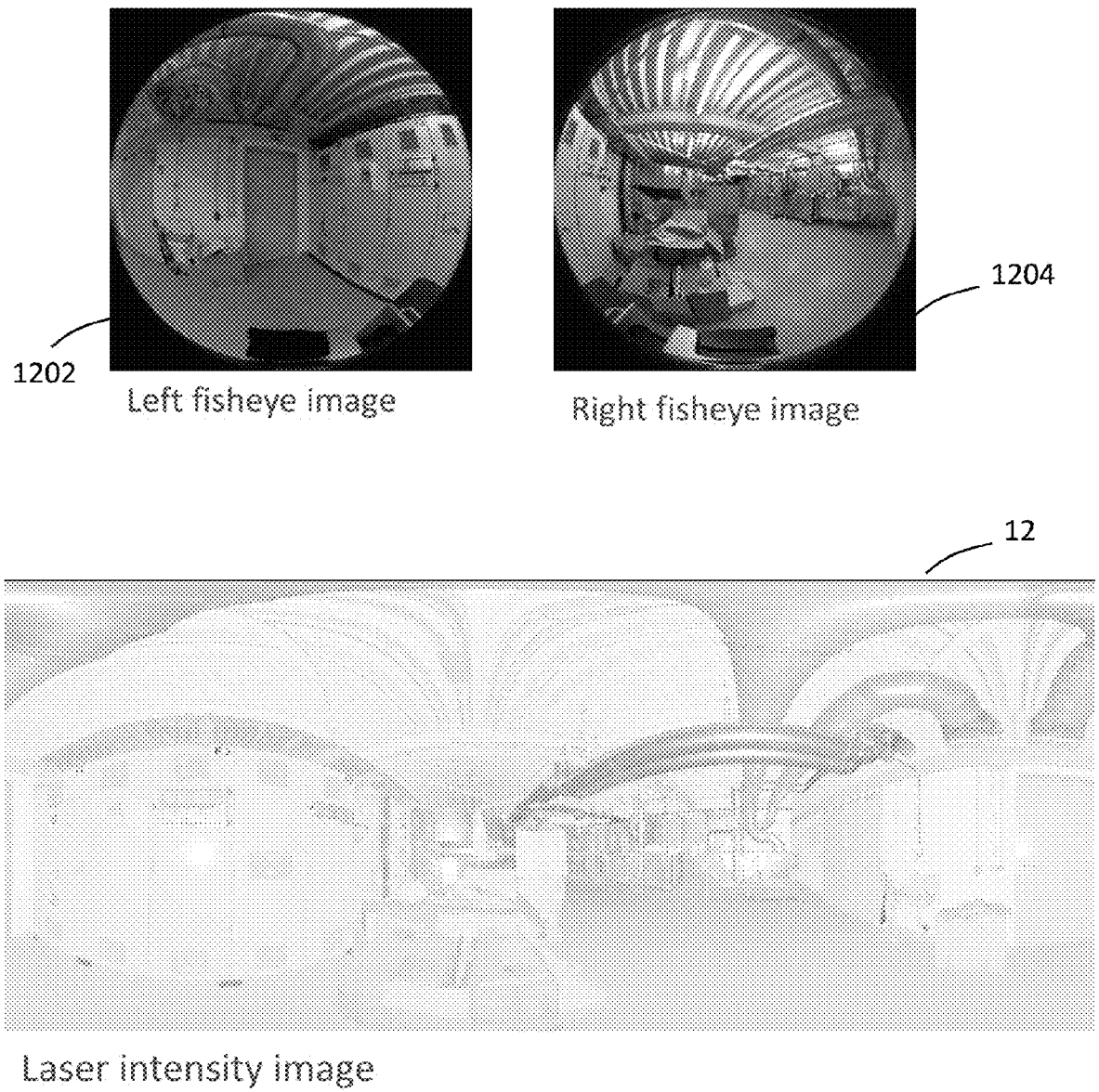
FIGS. 8-11 depict an example scenario of hybrid feature matching according to one or more embodiments.
Figure 9:
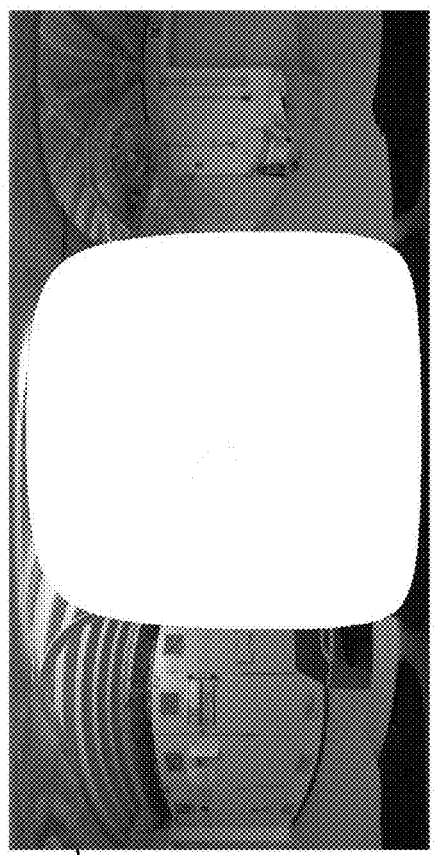
Figure 9:
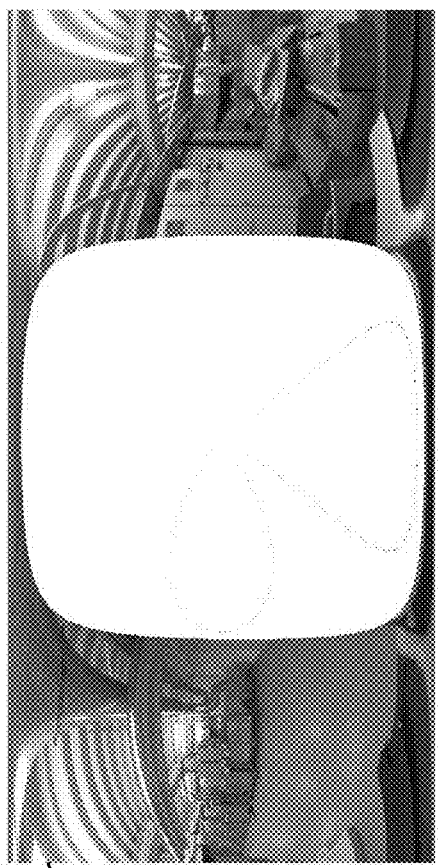
Figure 9:
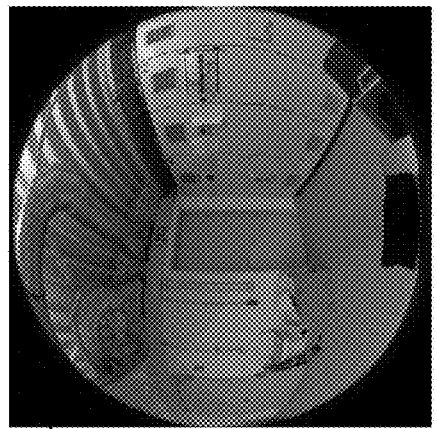
Figure 9:

FIGS. 8-11 depict an example scenario of feature matching according to one or more embodiments. FIG. 8 depicts a first color image 1202 captured from a left camera of a dual camera ultrawide-angle camera 66, and a second color image 1204 from a right camera of the camera 66. The two images 1202, 1204, form the color image 10 to be used for colorizing the point cloud captured by the scanner 20, or any other applications. Further, a corresponding intensity image 12 is also depicted.

Figure 10:
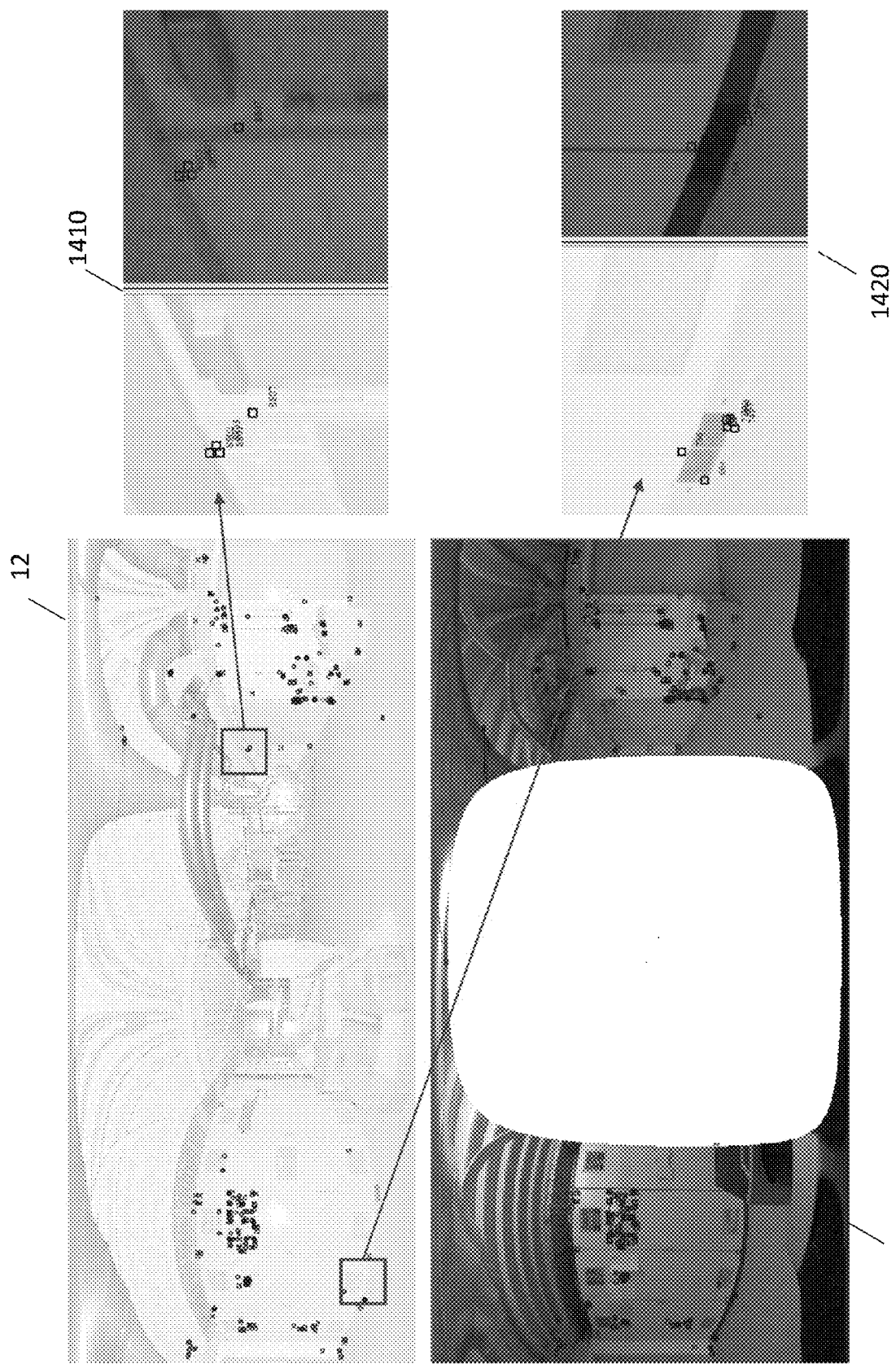
Figure 11:
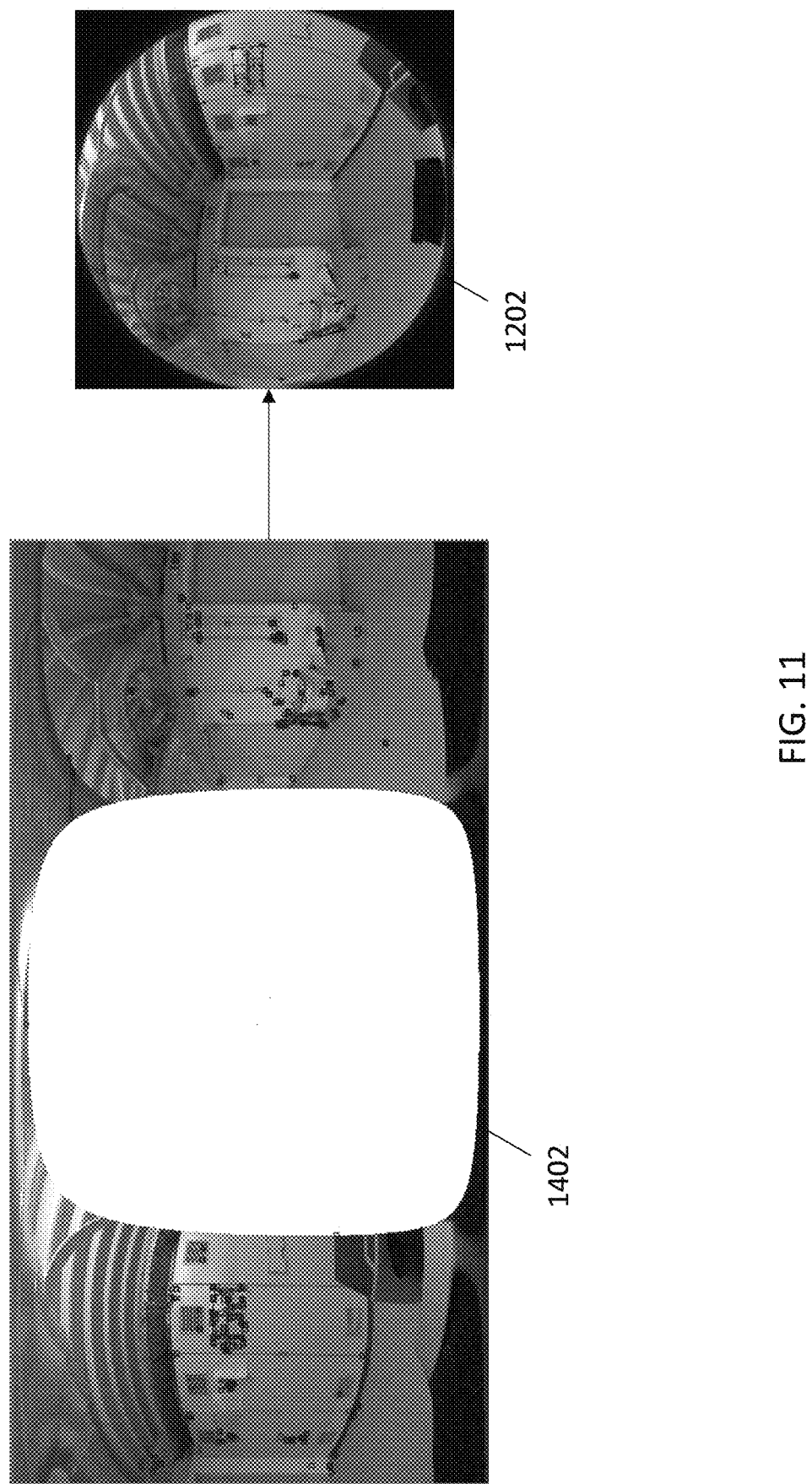

FIG. 12 depicts the ultrawide-angle images converted to corresponding spherical images 1302, 1304. The spherical images 1302, 1304 are converted to luminance images. FIG. 10 depicts a luminance image 1402 obtained from the spherical image 1302. Further, successful matching results are shown in view 1410, and 1420, even at regions with different contrast and brightness difference. In both views 1410, 1420, a portion of the intensity image 12 is shown on the left, and a portion of the relative luminance image 1402 is shown on the right. FIG. 11 depicts a reverse transformation of the matched features from the luminance image 1402 to the corresponding color image 1202. The matching features are also depicted across the intensity image 12 and the ultrawide-angle color image 1202. It should be noted that FIGS. 10-11 depict the feature matching being performed using the color image 1202 from the left camera, and similar feature matching is performed using the color image 1204 from the right camera. The results of the feature matching using the right image are not shown.

As noted earlier, mapping the point cloud with the color image is a technical challenge. In existing mapping techniques, the accuracy of feature matching depends on the accuracy of correspondence of edges and particularly edge localization. Particularly, an edge at laser intensity image may have different position compared to the same edge at color image most likely because of different Point Spread Function (PSF). Such technical challenges are addressed by the technical solutions described herein. Embodiments of the technical solutions described herein improve the accuracy of the matching features, which in turn improves the accuracy of mapping the color image with the point cloud. Embodiments of the technical solutions, accordingly, improve colorization of the point cloud using the improved mapping.

The technical solutions described herein creates significant timesaving and flexibility for the user. The technical solutions provide an improvement to computing technology of 3D measurement devices, and particularly colorizing point clouds captured by a 3D scanner using an ultrawide-angle image. The technical solutions described herein provide a practical application of colorizing a point cloud by mapping color image(s) from an ultrawide-angle with the point cloud using intensity image(s).

The colorizing can be performed at least in the following modes: static scanning, and dynamic scanning (e.g., FARO® SWIFT®).

It should be appreciated that while embodiments herein describe the reduction of the image point residuals with reference to the use of the camera with the ultrawide-angle lens and a three-dimensional scanner, this is for example purposes and the claims should not be so limited. In other embodiments, the residual reduction could be used in other applications that use an omnidirectional camera, or a camera with a single ultrawide-angle lens to improve the accuracy of the image.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
a three-dimensional (3D) scanner that captures a point cloud that comprises a plurality of 3D coordinates corresponding to one or more objects scanned in a surrounding environment;
a first camera that captures an intensity image of the surrounding environment corresponding to the point cloud, each pixel in the intensity image representing a luminance of reflected light;
an auxiliary camera configured to capture an ultrawide-angle color image of the surrounding environment corresponding to the point cloud, each pixel in the color image representing a color; and
one or more processors configured to colorize the point cloud using the color image by mapping the color image to the point cloud using the intensity image, wherein, mapping the color image to the intensity image comprises:
detecting a plurality of features from the intensity image using a feature-extraction algorithm;
extracting a feature from the plurality of features based on a determination that the feature is not within a predetermined vicinity of an edge in the intensity image;
creating a template by selecting a portion of a predetermined size from the intensity image with the feature at the center;
creating a search window with the same size as the template by selecting a portion of a luminance image as a search space, wherein the luminance image is obtained by transforming the color image;
computing a cost value for each pixel of the search space by comparing an image gradient of the template with an image gradient of the search window; and
determining a matching point in the color image corresponding to the feature based on the cost value for each pixel of search space.

2. The system of claim 1, wherein the template comprises a first template based on an image gradient along x-axis and a second template based on image gradient along y-axis.

3. The system of claim 1, wherein the cost value is computed using normalized values of the template and the search window.

4. The system of claim 1, wherein the search window comprises a first search window based on an image gradient along x-axis and a second search window based on image gradient along y-axis.

5. The system of claim 1, wherein the color image is transformed to a spherical image, and the spherical image is transformed into the luminance image.

6. The system of claim 1, wherein a search window is selected from the luminance image, and the cost value is computed by comparing each pixel in the template with each pixel of the search window.

7. The system of claim 1, wherein the color image comprises a first image captured by a first lens of the auxiliary camera and a second image captured by a second lens of the auxiliary camera.

8. The system of claim 1, wherein the camera is an integral part of the 3D scanner.

9. The system of claim 1, wherein the auxiliary camera is mounted on the 3D scanner at a predetermined position relative to the 3D scanner.

10. A method comprising:
colorizing a point cloud using a color image by mapping the color image to the point cloud using an intensity image, wherein, the point cloud is captured by a 3D scanner, the intensity image is captured by a camera, and the color image is captured by an auxiliary camera, and wherein mapping the color image to the intensity image comprises:
detecting a plurality of features from the intensity image using a feature-extraction algorithm;
extracting a feature from the plurality of features based on a determination that the feature is not within a predetermined vicinity of an edge in the intensity image;
creating a template by selecting a portion of a predetermined size from the intensity image with the feature at the center;
creating a search window of the same size as the template by selecting a portion of a luminance image as a search space, wherein the luminance image is obtained by transforming the color image;
computing a cost value for each pixel of the search space by comparing normalized image gradient of the template with normalized image gradient of the search window; and
determining a matching point in the color image corresponding to the feature based on the cost value for each pixel of the search space.

11. The method of claim 10, wherein the template comprises a first template based on an image gradient along x-axis and a second template based on image gradient along y-axis.

12. The method of claim 10, wherein the search window comprises a first search window based on an image gradient along x-axis and a second search window based on image gradient along y-axis.

13. The method of claim 10, wherein the color image is transformed to a spherical image, and the spherical image is transformed into the luminance image.

14. The method of claim 10, wherein the search window is selected from the luminance image, and the cost value is computed by comparing each pixel in the template with each pixel in the search window.

15. The method of claim 10, wherein the color image comprises a first image captured by a first lens of the auxiliary camera and a second image captured by a second lens of the auxiliary camera.

16. A computer program product comprising one or more memory devices with computer executable instructions stored thereon, the computer executable instructions when executed by one or more processors cause the one or more processors to perform a method comprising:
colorizing a point cloud using a color image by mapping the color image to the point cloud using an intensity image, wherein, the point cloud is captured by a 3D scanner, the intensity image is captured by a camera, and the color image is captured by an auxiliary camera, and wherein mapping the color image to the intensity image comprises:

detecting a plurality of features from the intensity image using a feature-extraction algorithm;

extracting a feature from the plurality of features based on a determination that the feature is not within a predetermined vicinity of an edge in the intensity image;

creating a template by selecting a portion of a predetermined size from the intensity image with the feature at the center;

creating a search window of the same size as the template by selecting a portion of a luminance image as a search space, wherein the luminance image is obtained by transforming the color image;

computing a cost value for each pixel of the search space by comparing normalized image gradient of the template with normalized image gradient of the search window; and determining a matching point in the color image corresponding to the feature based on the cost value for each pixel of the search space.

17. The computer program product of claim 16, wherein the template comprises a first template based on an image gradient along x-axis and a second template based on image gradient along y-axis.

18. The computer program product of claim 16, wherein the search window comprises a first search window based on an image gradient along x-axis and a second search window based on image gradient along y-axis.

19. The computer program product of claim 16, wherein the search window is selected from the luminance image, and the cost value is computed by comparing each pixel in the template with each pixel in the search window.

20. The computer program product of claim 16, wherein the color image comprises a first image captured by a first lens of the auxiliary camera and a second image captured by a second lens of the auxiliary camera.

* * * * *